US012665979B2

(12) United States Patent
Cheng

(10) Patent No.: US 12,665,979 B2
(45) Date of Patent: Jun. 23, 2026

(54) VIDEO PROCESSING METHOD FOR PERFORMING PARTIAL HIGHLIGHTING WITH AID OF AUXILIARY INFORMATION DETECTION, AND ASSOCIATED SYSTEM ON CHIP

(71) Applicant: Realtek Semiconductor Corp., HsinChu (TW)

(72) Inventor: Chia-Chun Cheng, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 257 days.

(21) Appl. No.: 18/221,891

(22) Filed: Jul. 14, 2023

(65) Prior Publication Data

US 2024/0040070 A1     Feb. 1, 2024

(30) Foreign Application Priority Data

Jul. 26, 2022     (TW) .................................. 111127910

(51) Int. Cl.
| *H04N 5/262* | (2006.01) |
| *G06V 40/16* | (2022.01) |

(Continued)

(52) U.S. Cl.
CPC ......... *H04N 5/2628* (2013.01); *G06V 40/174* (2022.01); *G06V 40/28* (2022.01); *G10L 17/06* (2013.01); *G10L 25/78* (2013.01)

(58) Field of Classification Search
CPC .... H04N 5/2628; G06V 40/174; G06V 40/28; G06V 20/41; G06V 40/11; G06V 40/161;
(Continued)

(56) References Cited

U.S. PATENT DOCUMENTS

| 9,686,605 | B2 * | 6/2017 | Sun ....................... G06V 40/161 |
| 2008/0013786 | A1 * | 1/2008 | Lin ......................... G06V 10/24 |
| | | | 382/103 |

(Continued)

FOREIGN PATENT DOCUMENTS

| CN | 114666454 A | 6/2022 |
| JP | 2010541398 A | * 9/2008 |

*Primary Examiner* — Yogeshkumar Patel
(74) *Attorney, Agent, or Firm* — Winston Hsu

(57) ABSTRACT

A system on chip (SoC) for performing partial highlighting with the aid of auxiliary information detection includes a person recognition circuit, a sound detection circuit, an auxiliary information detection circuit and a processing circuit. The person recognition circuit obtains image data from an image capturing device, and performs person recognition on the image data to generate a recognition result. The sound detection circuit receives a plurality of sound signals from a plurality of microphones, and determines a voice characteristic value of a main sound. The auxiliary information detection circuit generates auxiliary information for calibrating the voice characteristic value of the main sound. The processing circuit determines a specific region in the image data according to the recognition result, the auxiliary information, and the voice characteristic value, and processes the image data to highlight the specific region.

15 Claims, 7 Drawing Sheets

(51) Int. Cl.
*G06V 40/20* (2022.01)
*G10L 17/06* (2013.01)
*G10L 25/78* (2013.01)

(58) Field of Classification Search
CPC ....... G06V 40/171; G10L 17/06; G10L 25/78; G10L 17/00
See application file for complete search history.

(56) References Cited

U.S. PATENT DOCUMENTS

| | | | |
|---|---|---|---|
| 2015/0341719 A1* | 11/2015 | Sun | G06V 40/161 |
| | | | 381/92 |
| 2019/0215464 A1* | 7/2019 | Kumar | H04N 7/08 |
| 2019/0341053 A1* | 11/2019 | Zhang | H04L 12/1827 |
| 2020/0099889 A1* | 3/2020 | Sugihara | H04N 7/147 |
| 2021/0294424 A1* | 9/2021 | Dong | G06V 40/10 |
| 2022/0415003 A1* | 12/2022 | Chen | H04N 7/147 |
| 2024/0037993 A1* | 2/2024 | Cheng | H04N 7/147 |

* cited by examiner

810

910

VIDEO PROCESSING METHOD FOR PERFORMING PARTIAL HIGHLIGHTING WITH AID OF AUXILIARY INFORMATION DETECTION, AND ASSOCIATED SYSTEM ON CHIP

BACKGROUND OF THE INVENTION

1. Field of the Invention

The present invention is related to a method of video processing for live streaming, and more particularly, to a video processing method that is arranged to perform partial highlighting with the aid of auxiliary information, and an associated system on chip (SoC).

2. Description of the Prior Art

Live streaming is widely used in modern society, and has seen a particular rise in popularity during the Covid-19 pandemic when face-to-face meetings were replaced with remote video conferences. When one party in a remote video conference includes multiple participants that can be seen in an image (e.g. an image displayed on a screen), it may be difficult for the other party's participants to distinguish a speaker. Specifically, assume that a current remote video conference is taking place between a first party and a second party, wherein the first party has multiple participants in a physical conference room, and the audio and video information of the physical conference room is captured by a microphone and camera and transmitted to participants in the remote second party through a network. Due to the relative positioning of the multiple participants in the first party and limitations with regards to the size of the image, the participants of the second party may not be able to correctly identify a current speaker within the image, such that the participants of the second party may be confused as to whom the current speaker is, thereby affecting efficiency of the conference.

SUMMARY OF THE INVENTION

It is therefore one of the objectives of the present invention to provide a person tracking technology that can be applied to a remote video, wherein a current speaker in an image (e.g. an image displayed on a screen) can be highlighted, to address the above-mentioned issues.

According to an embodiment of the present invention, a system on chip (SoC) arranged to perform partial highlighting with the aid of auxiliary information detection is provided. The SoC comprises a person recognition circuit, an auxiliary information detection circuit, a sound detection circuit, and a processing circuit. The person recognition circuit is arranged to obtain an image data from an image capturing device, and perform person recognition upon the image data to generate a recognition result. The sound detection circuit is arranged to receive a plurality of sound signals from multiple microphones, and determine a voice characteristic value of a main sound. The auxiliary information detection circuit is arranged to perform auxiliary information detection to generate auxiliary information for calibrating the voice characteristic value of the main sound. The processing circuit is coupled to the person recognition circuit, the auxiliary information detection circuit, and the sound detection circuit, and is arranged to determine a specific region in the image data according to the recognition result, the auxiliary information, and the voice characteristic value of the main sound, and process the image data to highlight the specific region, wherein regarding determination of the specific region in the image data, the processing circuit calibrates the voice characteristic value of the main sound by the auxiliary information to maintain usability of the voice characteristic value of the main sound.

According to an embodiment of the present invention, a video processing method for performing perform partial highlighting with the aid of auxiliary information detection is provided. The video processing method comprises: obtaining an image data from an image capturing device, and performing person recognition upon the image data to generate a recognition result; receiving a plurality of sound signals from a plurality of microphones, and determining a voice characteristic value of a main sound; performing auxiliary information detection to generate auxiliary information for calibrating the voice characteristic value of the main sound; determining a specific region in the image data according to the recognition result, the auxiliary information, and the voice characteristic value of the main sound, wherein regarding determination of the specific region in the image data, the voice characteristic value of the main sound is calibrated according to the auxiliary information to maintain usability of the voice characteristic value of the main sound; and processing the image data to highlight the specific region.

One of the benefits of the present invention is that, by detecting the current speaker and highlighting the speaker in the image data, the video processing method and the SoC of the present invention can enable participants in the remote conference room to clearly identify the speaker, which can effectively improve the conference efficiency. In addition, the video processing method and the SoC of the present invention can ensure the accuracy of related operations with the aid of auxiliary information detection.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
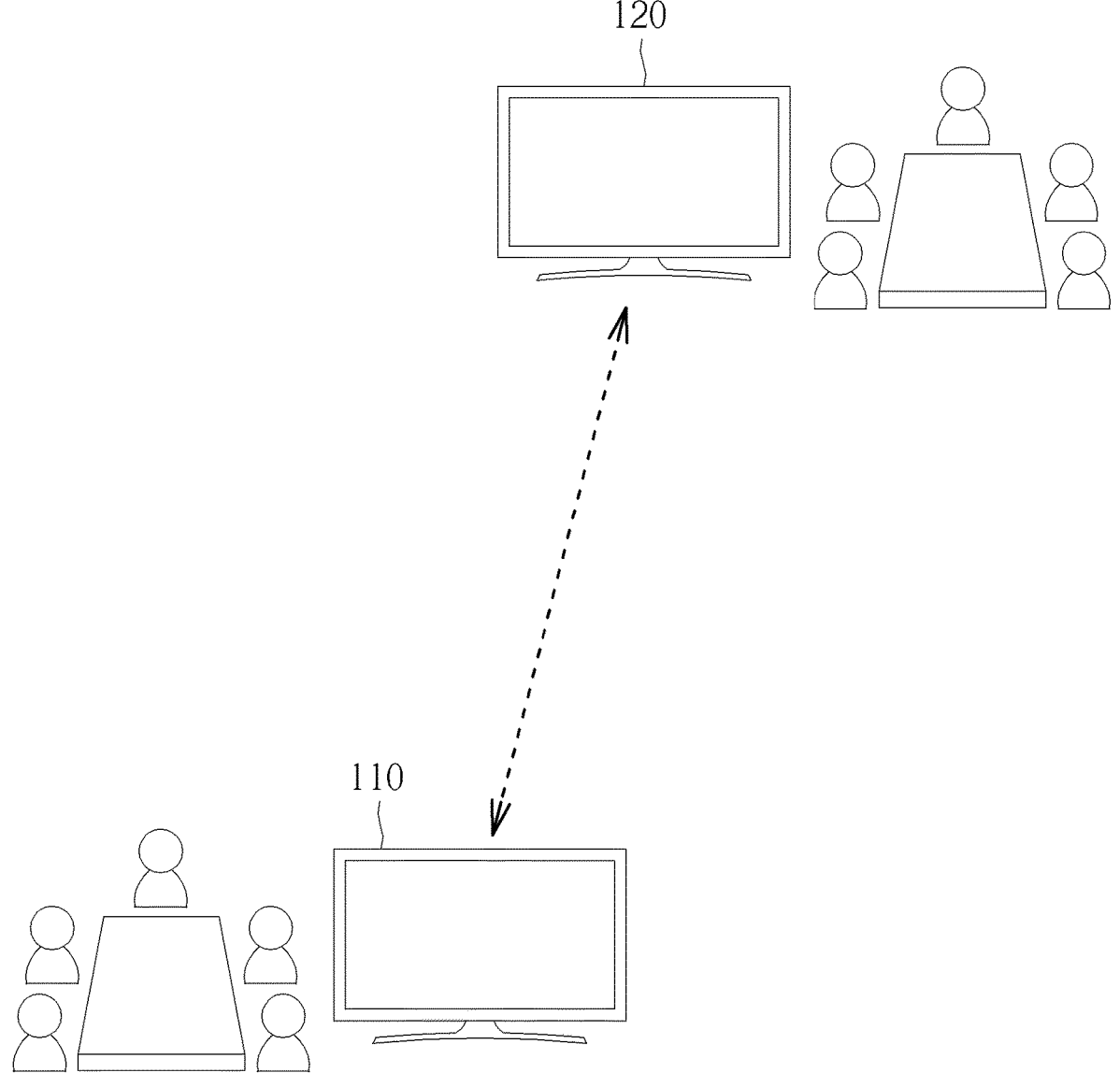
FIG. 1 is a diagram illustrating a remote video conference according to an embodiment of the present invention.

FIG. 1 is a diagram illustrating a remote video conference according to an embodiment of the present invention. As shown in FIG. 1, an electronic device 110 is in a first conference room for real-time capturing of an image of the first conference room and real-time recording of sound in the first conference room, and the information is transmitted to a second conference room through a network to make an electronic device 120 in the second conference room play the video and sound of the first conference room. Simultaneously, the electronic device 120 in the second conference room also captures an image of the second conference room and records sound in the second conference room in real time, and transmits the information to the first conference room through the network so that electronic device 110 in the first conference room plays the video and sound of the second conference room. In this embodiment, the electronic devices 110 and 120 can be any electronic device with an image and audio transmission and reception function and a network communication function, such as a television (TV), a laptop, a tablet, a cellphone, etc.

When one party in a remote video conference includes multiple participants in an image (e.g. an image displayed on a screen), the other party's participants may sometimes have difficulty distinguishing a current speaker from among the participants in the image. For example, if the participants in the second conference room are not familiar with the respective voices of the participants in the first conference room, or if the speaker in the first conference room is not facing the camera, the participants in the second conference room may sometimes find it difficult to identify the speaker, which can result in communication difficulties.

A method for highlighting the speaker is designed in a system on chip (SoC) in the electronic device 110, so that the participants in the second conference room can clearly identify the speaker in the first conference room, to address the above-mentioned issues.

Figure 2:
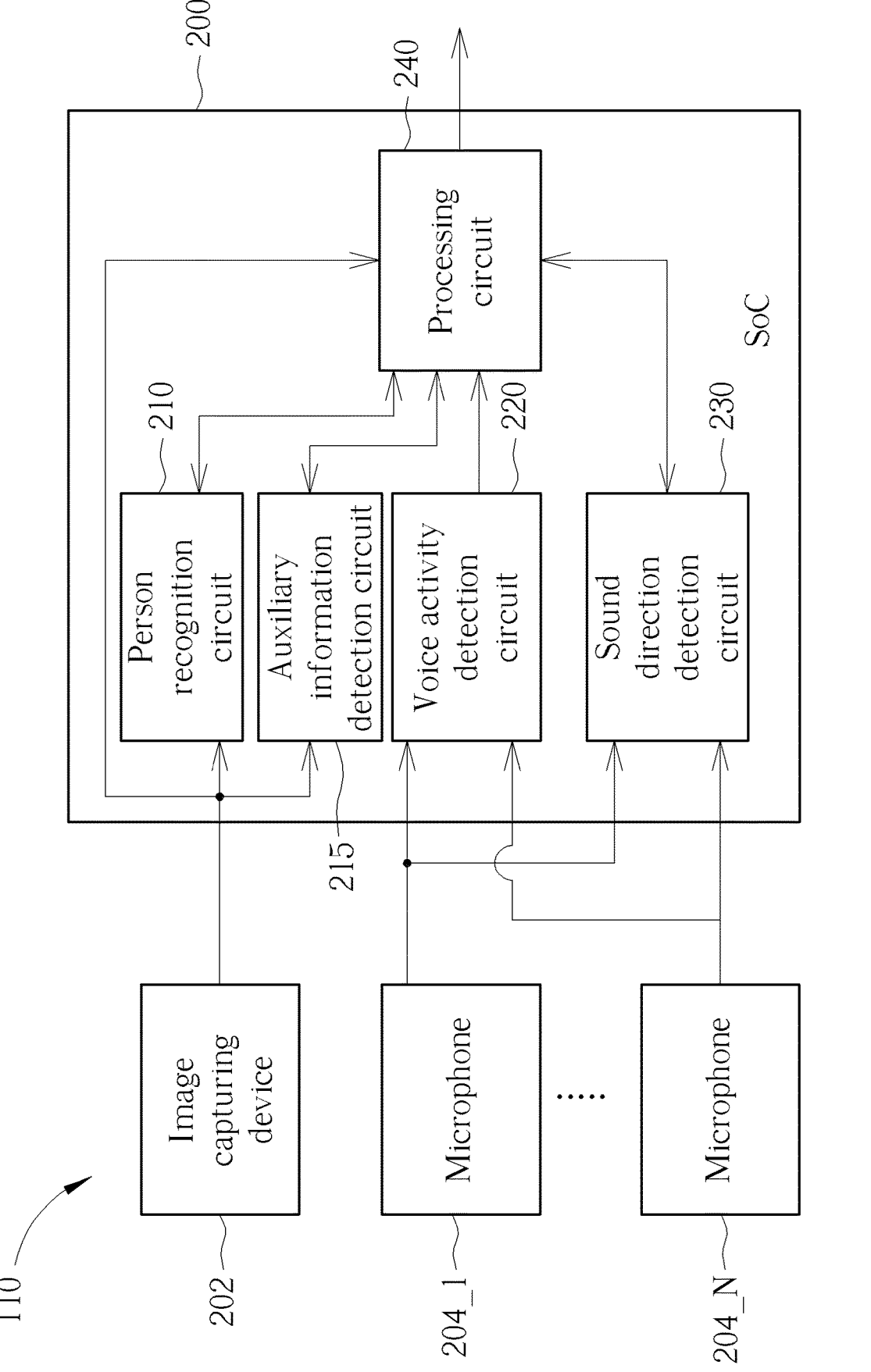
FIG. 2 is a diagram illustrating an electronic device according to an embodiment of the present invention.

FIG. 2 is a diagram illustrating the electronic device 110 according to an embodiment of the present invention. As shown in FIG. 2, the electronic device 110 includes an SoC 200, an image capturing device 202, and multiple microphones 204_1-204_N, wherein N is a positive integer greater than 1. In addition, the SoC 200 includes a person recognition circuit 210, an auxiliary information detection circuit 215, a voice activity detection circuit 220, a sound detection circuit (e.g. a sound direction detection circuit 230), and a processing circuit 240. In this embodiment, the image capturing device 202 may be a camera or a video camera that continuously captures the image in the first conference room in real time to generate and transmit an image data to the SoC 200, wherein the image data received by the SoC 200 can be an original image data or a data that has undergone some image processing operations. The microphones 204_1-204_N may be digital microphones which are placed at different locations of the electronic device 110 to generate and transmit multiple sound signals to the SoC 200, respectively.

It should be noted that the image capturing device 202 and the microphones 204_1-204_N are disposed in the electronic device 110; however, in some embodiments, the image capturing device 202 and the microphones 204_1-204_N are externally connected to the electronic device 110.

The person recognition circuit 210 of the SoC 200 is arranged to perform person recognition upon the image data received by the image capturing device 202, to first determine whether there is a person/people in the received image data, and then determine a characteristic value of each person and a position/region of each person in the image (e.g. the image displayed on the screen). Specifically, the person recognition circuit 210 may utilize a deep learning method or a neural network method to process at least one frame in the image data. For example, multiple different convolution kernels (e.g. convolution filters) are utilized to perform multiple convolution operations upon the at least one frame (e.g. an image frame) to recognize whether there is a person in the at least one frame. In addition, for a detected person, a characteristic value of the detected person (or a characteristic value of a region in which the detected person is located) is determined by the above-mentioned deep learning method or neural network method, wherein the characteristic value can be a multi-dimensional vector (e.g. a vector with dimension "512"). It should be noted that the above-mentioned circuit design related to person recognition is well known to those with ordinary knowledge in the art. One of the key points of this embodiment is the application of people recognized by the person recognition circuit 210 and their characteristic values. Other details of the person recognition circuit 210 are not repeated here.

The auxiliary information detection circuit 215 is arranged to perform auxiliary information detection to generate auxiliary information for calibrating an output of the sound direction detection circuit 230. For example, the auxiliary information detection circuit 215 can be implemented by a hand gesture detection circuit that is arranged to perform hand gesture detection upon a hand gesture image data in the image data received by the image capturing device 202 to generate at least one hand gesture detection result as the auxiliary information. More particularly, the auxiliary information detection circuit 215 may include multiple sub-circuits for a two-stage operation, which are expressed as follows:

(1) a first sub-circuit, arranged to perform human hand recognition upon the image data to generate a human hand recognition result, and obtain the hand gesture image data from the image data according to the human hand recognition result; and (2) a second sub-circuit, arranged to perform the hand gesture detection upon the hand gesture image data to generate the at least one hand gesture detection result; but the present invention is not limited thereto. Specifically, regarding a first-stage operation in the two-stage operation, the first sub-circuit in the auxiliary information detection circuit 215 may utilize the deep learning method or the neural network method to process each frame in the image data (e.g. utilize multiple different convolution kernels to perform multiple convolution operations upon the frame (e.g. the image frame), to recognize whether there is a human hand in the frame). In response to the human hand recognition result (e.g. when a human hand in the frame is recognized), the auxiliary information detection circuit 215 can obtain the hand gesture image data from the image data. In addition, regarding a second-stage operation in the two-stage operation, the second sub-circuit in the auxiliary information detection circuit 215 may utilize the deep learning method or the neural network method to process the hand gesture image data (e.g. utilize multiple different convolution kernels to perform multiple convolution operations upon the hand gesture image data, to recognize whether there is a predetermined hand gesture in the hand gesture image data). It should be noted that the circuit designs related to the human hand recognition and the hand gesture detection are similar to that of the above-mentioned person recognition, and are therefore well known to those with ordinary knowledge in the art. One of the key points of this embodiment is to perform subsequent operations according to the auxiliary information generated by the auxiliary information detection circuit 215. As a result, details of the auxiliary information detection circuit 215 are omitted here for brevity.

The voice activity detection circuit 220 is arranged to receive sound signals from the microphones 204_1-204_N, and determine whether there is a voice component in the sound signals. Specifically, the voice activity detection circuit 220 can perform the following operations: performing noise reduction upon the received sound signals; converting the sound signals to the frequency domain and then processing a block to obtain characteristic values; and comparing the obtained characteristic values with a reference value to determine whether the sound signals are voice signals. It should be noted that, since circuit designs related to the voice activity detection are well known to those with ordinary knowledge in the art, and one of the key points of this embodiment is to perform subsequent operations according to the determination result generated by the voice activity detection circuit 220, details of the voice activity detection circuit 220 are omitted here for brevity. In addition, in another embodiment, the voice activity detection circuit 220 can only receive sound signals from a part of the microphones 204_1-204_N, without receiving sound signals of all microphones 204_1-204_N.

Regarding operations of the sound direction detection circuit 230, the microphones 204_1-204_N can be placed at several known locations of the electronic device 110, so that the sound direction detection circuit 230 can determine an azimuth of a main sound in the first conference room (i.e. direction and angle of a main speaker relative to the electronic device 110) according to a time difference of sound signals from the microphones 204_1-204_N. In this embodiment, the sound direction detection circuit 230 can only determine one direction at a time; that is, if there are multiple people in the first conference room talking at the same time (or making other sounds), the sound direction detection circuit 230 will determine which direction the main sound comes from according to some characteristics (e.g. signal strength) of the received multiple sound signals. It should be noted that, since the circuit designs related to the sound direction detection circuit 230 are well known to those with ordinary knowledge in the art, and one of the key points of this embodiment is to perform subsequent operations according to a determination result generated by the sound direction detection circuit 230, details of the sound direction detection circuit 230 are omitted here for brevity.

Figure 3:
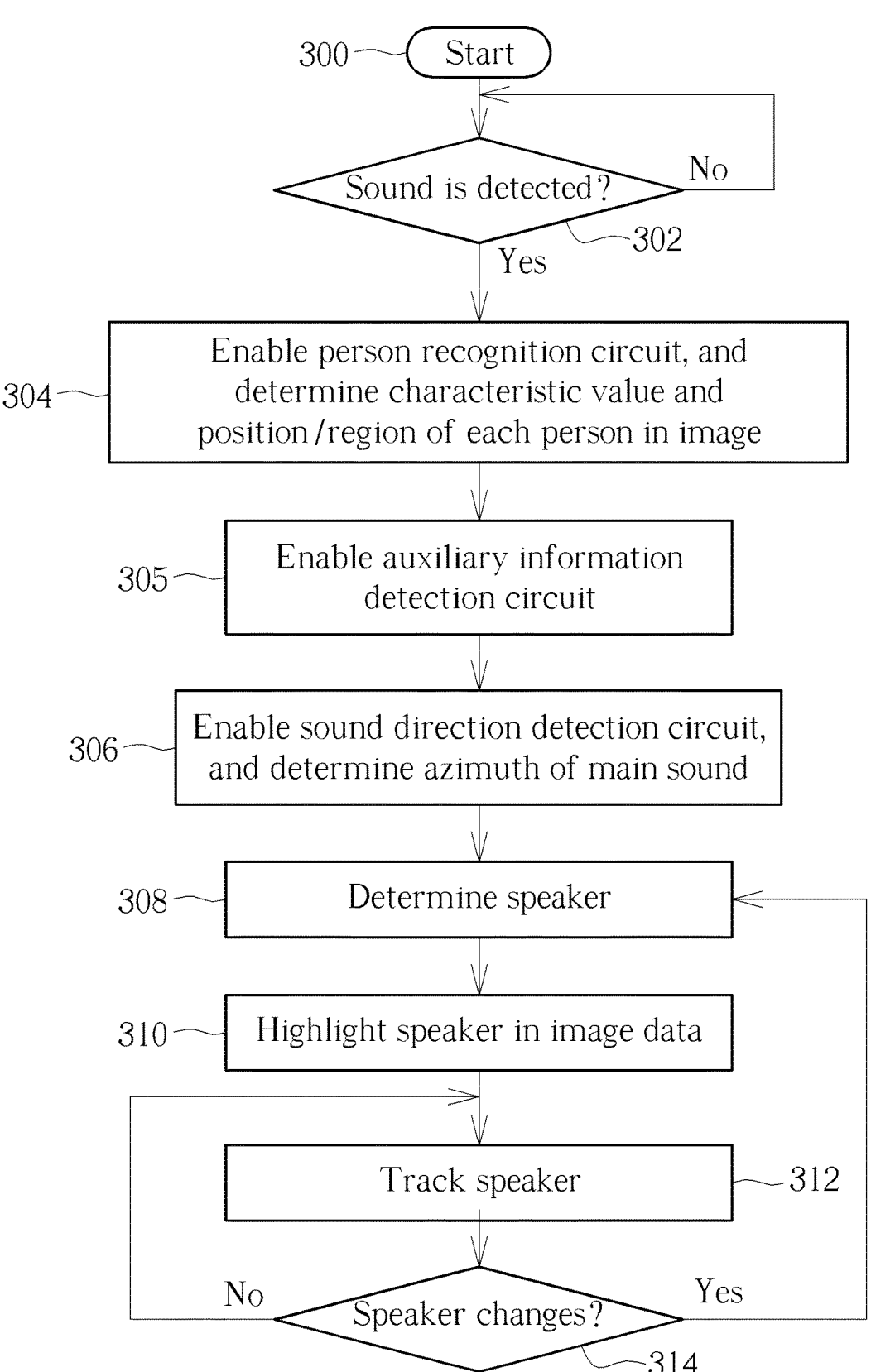
FIG. 3 is a flow chart of a video processing method according to an embodiment of the present invention.

FIG. 3 is a flow chart of a video processing method according to an embodiment of the present invention, wherein the video processing method can be applicable to the SoC 200.

In Step 300, the flow starts, the electronic device 110 is powered on, and the connection with the electronic device 120 of the second conference room is completed.

In Step 302, the voice activity detection circuit 220 receives the sound signals from the microphones 204_1-204_N and determines whether there is a voice component in the sound signals. If yes, Step 304 is entered; if no, the flow returns to Step 302 to keep detecting whether there is a voice component in the sound signals.

Figure 4:
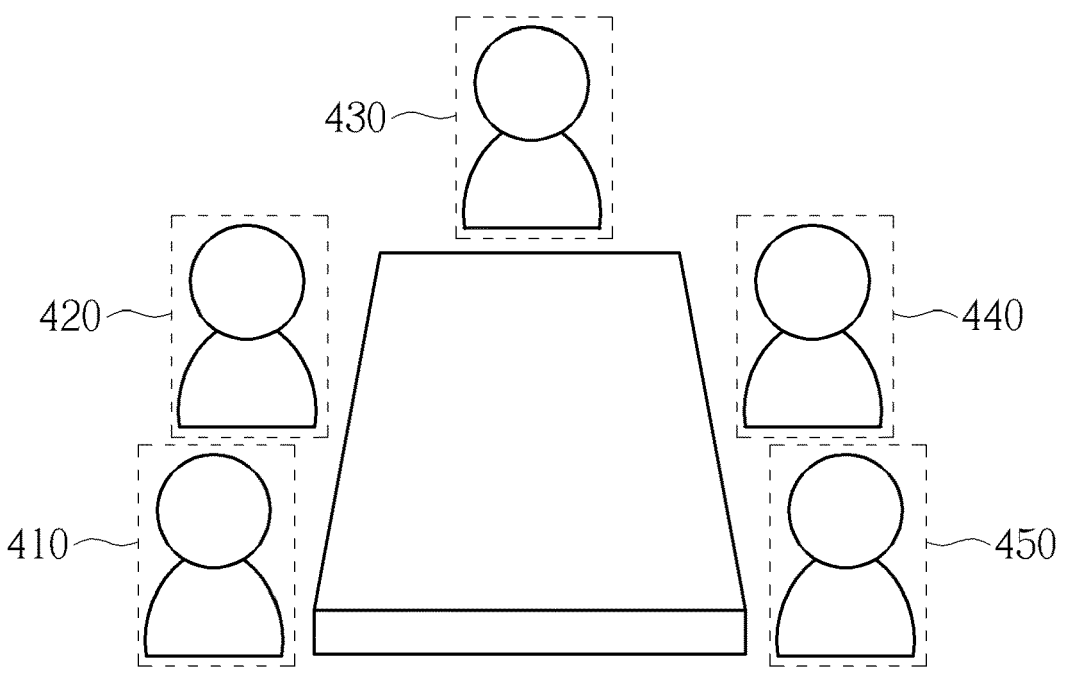
FIG. 4 is a diagram illustrating a person recognition circuit that recognizes multiple people in an image such as an image displayed on a screen according to an embodiment of the present invention.

In Step 304, the processing circuit 304 enables the person recognition circuit 210 after the voice activity detection circuit 220 detects that the sound signals have the voice component, so that the person recognition circuit 210 starts to perform person recognition upon the received image data to determine whether there is a person in the received image data, and determines the characteristic value of each person and the position/region of each person in the image (e.g. the image displayed on the screen, such as the image frame). Take FIG. 4 as an example. The person recognition circuit detects that there are five people in the image, and therefore can determine regions 410-450 of each person in the image (e.g. the image frame) and determine the characteristic values of the image in the regions 410-450, respectively, as the characteristic value of each person.

In Step 305, the processing circuit 240 enables the auxiliary information detection circuit 215 so that the auxiliary information detection circuit 215 starts to perform auxiliary information detection (e.g. the hand gesture detection), to generate the auxiliary information for calibrating a voice characteristic value (e.g. the azimuth) of the main sound to maintain usability of the voice characteristic value of the main sound.

In Step 306, the processing circuit 240 enables the sound direction detection circuit 230, and the sound direction detection circuit 230 starts to determine the direction and the angle of the main sound relative to the electronic device 110 according to the time difference of the sound signals from the microphones 204_1-204_N. It should be noted that Step 304, Step 305, and Step 306 may be executed simultaneously, i.e. the execution of this embodiment is not limited to the sequence shown in FIG. 3.

For example, the voice characteristic value (e.g. the azimuth) of the main sound may become inaccurate due to one or more reasons (e.g. the microphones 204_1-204_N are not aligned with a center of a predetermined coordinate system and/or the image capturing device 202 is rotatable but the microphones 204_1-204_N are fixed). More particularly, when the voice characteristic value (e.g. the azimuth) of the main sound is utilized to indicate any region in at least a part of regions (e.g. a part of or all regions) in the regions 410-450, there may be a voice characteristic value difference relative to a center point of the region (e.g. an azimuth difference, which can correspond to a horizontal coordinate difference in the image frame). With the aid of the auxiliary information, under a condition that the voice characteristic value (e.g. the azimuth) of the main sound becomes inaccurate, the processing circuit 240 can still use the voice characteristic value of the main sound in subsequent operations, without reducing correctness of the subsequent operations, but the present invention is not limited thereto. The processing circuit 240 can determine a specific region (e.g. a region in which the speaker is located) in the image (e.g. the image frame, such as the image data) according to the recognition result generated by the person recognition circuit 210, the auxiliary information, and the voice characteristic value (e.g. the azimuth) of the main sound. More particularly, regarding determination of the specific region in the image (e.g. the image frame), the processing circuit 240 can calibrate the voice characteristic value (e.g. the azimuth) of the main sound according to the auxiliary information, to maintain usability of the voice characteristic value of the main sound, wherein the usability represents that the voice characteristic value of the main sound becomes usable after calibration, without causing any error determination.

In Step 308, according to the region (e.g. the regions 410-450 shown in FIG. 4) of each person in the image (e.g. the image frame, such as the image data) determined by the person recognition circuit 210 and the direction and the angle of the main speaker relative to the electronic device 110 detected by the sound direction detection circuit 230, the processing circuit 240 can determine the speaker in the image (e.g. the image frame) with the aid of the auxiliary information (e.g. a hand gesture detection result) generated by the auxiliary information detection circuit 215, and more particularly, determine that the current speaker in the image (e.g. the image frame such as the image data) is someone with the predetermined hand gesture (e.g. the person is raising his hand with the predetermined hand gesture), rather than any other person without the predetermined hand gesture (e.g. some other person talking informally), wherein the processing circuit 240 can selectively refer to the auxiliary information (e.g. a hand gesture detection result) generated by the auxiliary information detection circuit 215 to determine the speaker in the image (e.g. the image frame), but the present invention is not limited thereto.

Figure 5:
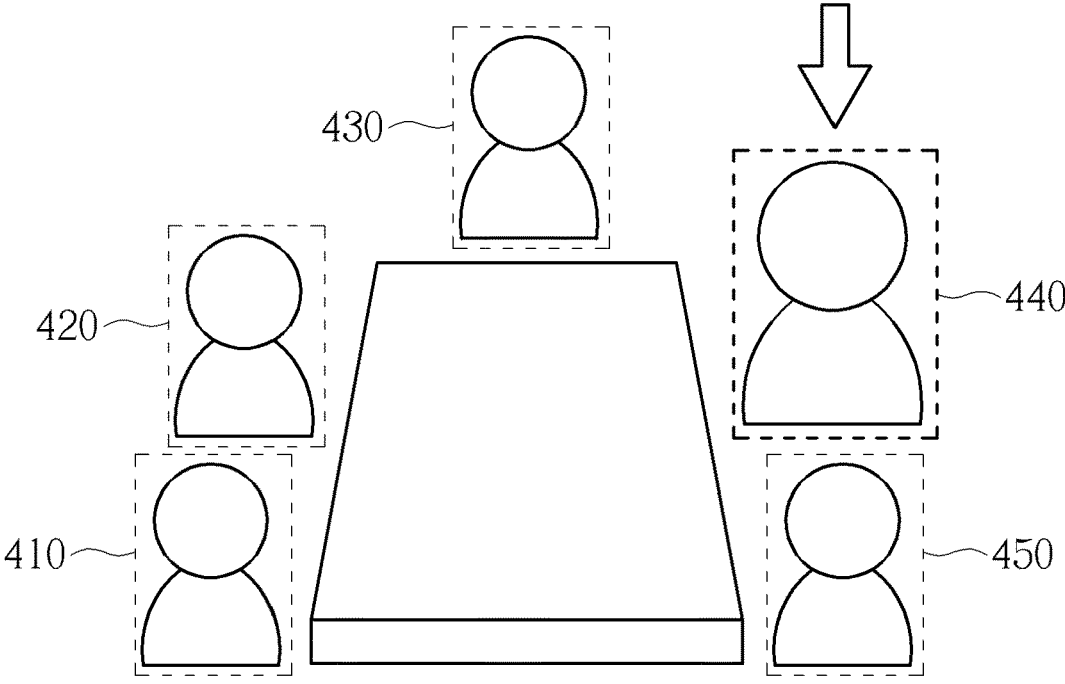
FIG. 5 is a diagram of highlighting a current speaker in an image according to an embodiment of the present invention.

In Step 310, after determining the current speaker in the image (e.g. the image frame), the processing circuit 240 processes the image data from the image capturing device 202 to highlight the main speaker in the image data. Specifically, FIG. 5 is a diagram of highlighting a current speaker in an image according to an embodiment of the present invention. It is assumed that the processing circuit 240 determines that the person in the region 440 is the main speaker. The processing circuit 240 can process the image data to magnify the person in the region 440, or add labels/arrows, or any other image processing methods to enhance the visual effect of the person in the region 440. The processing circuit 240 then transmits the processed image data to the back-end circuit for other image processing, and transmits it to the electronic device 120 in the second conference room through the network, so that the participants in the second conference room can clearly identify the current speaker in the first conference room.

It should be noted that enhancing the visual effect of the person in the region 440 does not necessarily need to visually enhance the entire region 440, and only a part of the region 440 being visually enhanced can also achieve the same effect. Take FIG. 5 as an example. The region 440 includes the head and body of the person, and the processing circuit 240 can magnify only the head of the person.

In Step 312, the processing circuit 240 keeps tracking the highlighted person, and keeps processing the image data from the image capturing device 202 to highlight the person in the image data.

Specifically, the person recognition circuit 210 can keep determining the characteristic value and the region of each person in the image (e.g. the image frame), and the processing circuit 240 can keep highlighting the person in the current and subsequent image (e.g. the image frame) according to the characteristic value of the highlighted person. Take the region 440 in FIG. 5 as an example. The processing circuit 240 can track regions/persons with characteristic values similar to the characteristic value of the region 440 (e.g. the characteristic value difference is within a range) in the subsequently received image (e.g. the image frame), to keep highlighting the person in the subsequent image (e.g. the image frame), even if the highlighted person does not speak for a short period of time in the subsequent image (e.g. the image frame) and the sound direction detection circuit 230 does not detect sound in the direction of the person.

It should be noted that, since the current speaker may move and may not keep speaking, Step 312 can prevent the image from turning on and turning off the visual effect for enhancing the speaker (which affects the mood of the participants in the second conference room).

In Step 314, according to the region of each person in the image (e.g. the image frame) determined by the person recognition circuit 210, the direction and the angle of the main speaker relative to the electronic device 110 detected by the sound direction detection circuit 230, and the detection result indicating that someone is speaking (i.e. the received sound signal has the voice component) generated by the voice activity detection circuit 220, the processing circuit 240 can correctly determine whether the speaker changes with the aid of the auxiliary information (e.g. a subsequent hand gesture result) generated by the auxiliary information detection circuit 215). If the determination is negative (e.g. none of the other people are speaking and raising their hands with the predetermined hand gesture), the method returns to Step 312 to keep tracking the current speaker. If the determination is positive (e.g. another person is speaking and raising their hand with the predetermined hand gesture), the method returns to Step 308 to determine a new speaker. Specifically, the sound direction detection circuit 230 can only detect the direction of the sound and cannot know whether the sound in the determined direction is a human sound. As a result, under a condition that the voice activity detection circuit 220 detects that the current sound signal has the voice component, if the direction and the angle of the main speaker relative to the electronic device 110 detected by the sound direction detection circuit 230 changes to the position of another person, the processing circuit 240 can determine that the speaker has changed. It should be noted that, in order to prevent the processing circuit 240 from constantly changing the highlighted person in the image data, Step 314 may be performed after a relatively long period of detection.

According to some embodiments, when the voice characteristic value (e.g. the azimuth) of the main sound becomes inaccurate, the processing circuit 240 can ensure correctness of associated operations with the aid of the auxiliary information detection. More particularly, if the voice characteristic value difference (e.g. the azimuth difference) is larger than a predetermined voice characteristic value difference threshold (e.g. an azimuth difference threshold), the processing circuit 240 can determine the speaker in the image (e.g. the image frame) according to the recognition result (e.g. the regions 410-450 including each person and respective characteristic values of each person in the regions 410-450) generated by the person recognition circuit 210, the voice characteristic value of the main sound, and the auxiliary information (e.g. the hand gesture detection result or the subsequent hand gesture detection result) generated by the auxiliary information detection circuit 215. When the voice characteristic value is still accurate (e.g. the voice characteristic value difference is smaller than the predetermined voice characteristic value difference threshold), the processing circuit 240 can determine the speaker in the image (e.g. the image frame) according to the recognition result (e.g. the regions 410-450 including each person and respective characteristic values of each person in the regions 410-450) generated by the person recognition circuit 210 and the voice characteristic value of the main sound, without referring to the auxiliary information (e.g. the hand gesture detection result or the subsequent hand gesture detection result) generated by the auxiliary information detection circuit 215.

Figure 6:
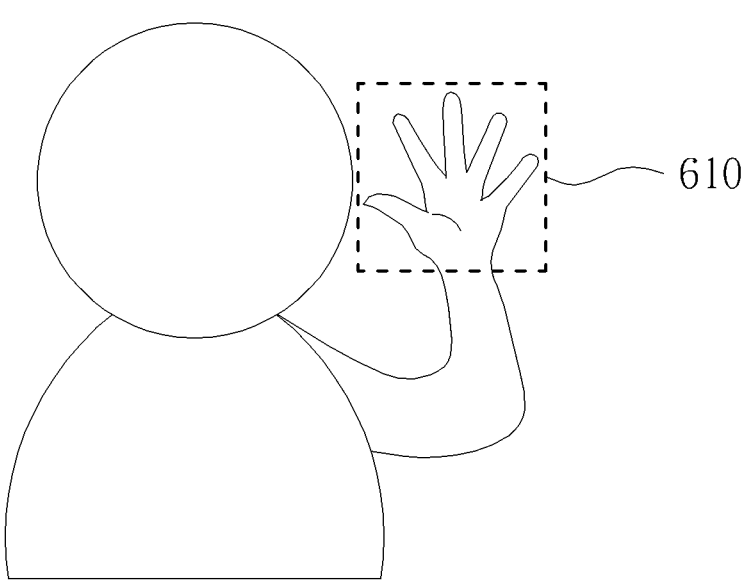
FIG. 6 is a diagram illustrating a predetermined hand gesture according to an embodiment of the present invention.

FIG. 6 is a diagram illustrating a predetermined hand gesture according to an embodiment of the present invention, wherein the predetermined hand gesture may be a predetermined hand gesture of the left hand. The auxiliary information detection circuit 215 can utilize the first sub-circuit to perform the human hand recognition upon the image (e.g. the image frame such as the image data), to generate the human hand recognition result, and obtain a partial image 610 from the image according to the human hand recognition result as a hand gesture image (e.g. the hand gesture image data). In addition, the auxiliary information detection circuit 215 can utilize the second sub-circuit to perform the hand gesture detection upon the hand gesture image (e.g. the hand gesture image data), to generate a corresponding hand gesture detection result. For brevity, similar descriptions for this embodiment are not repeated.

Figure 7:
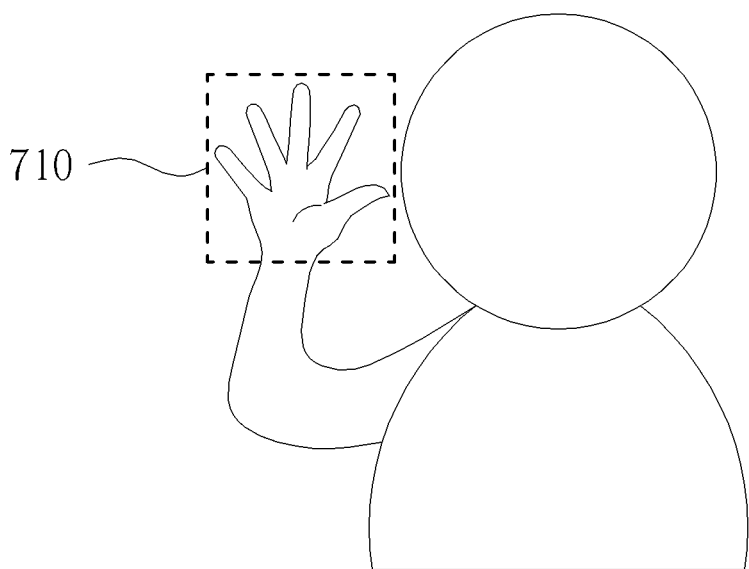
FIG. 7 is a diagram illustrating a predetermined hand gesture according to another embodiment of the present invention.

FIG. 7 is a diagram illustrating a predetermined hand gesture according to another embodiment of the present invention, wherein the predetermined hand gesture may be a predetermined hand gesture of the right hand. The auxiliary information detection circuit 215 can utilize the first sub-circuit to perform the human hand recognition upon the image (e.g. the image frame such as the image data), to generate the human hand recognition result, and obtain a partial image 710 from the image according to the human hand recognition result as a hand gesture image (e.g. the hand gesture image data). In addition, the auxiliary information detection circuit 215 can utilize the second sub-circuit to perform the hand gesture detection upon the hand gesture image (e.g. the hand gesture image data), to generate a corresponding hand gesture detection result. For brevity, similar descriptions for this embodiment are not repeated.

According to some embodiments, the auxiliary information detection circuit 215 is not limited to perform the hand gesture detection with a single predetermined hand gesture; more particularly, the predetermined hand gesture can be replaced by a predetermined hand gesture set, wherein the predetermined hand gesture set may include multiple predetermined hand gestures (e.g. the predetermined hand gestures shown in FIG. 6 and FIG. 7, respectively). For example, any person in the regions 410-450 can raise his hand with any predetermined hand gesture in the predetermined hand gesture set, and the processing circuit 240 can determine the speaker has been changed. For brevity, similar descriptions for this embodiment are not repeated in detail here.

According to some embodiments, a shape, type, direction, and/or finger count of the predetermined hand gestures in the predetermined hand gesture set may vary.

In the above embodiments, the auxiliary information detection circuit 215 can be implemented by the hand gesture detection circuit for performing hand gesture detection upon the hand gesture image data in the image data received from the image capturing device 202, to generate the at least one hand gesture detection result as the auxiliary information. More particularly, performing the auxiliary information detection to generate the auxiliary formation can include:

performing hand gesture detection upon the hand gesture image data in the image data to generate the hand gesture detection result as the auxiliary information;

wherein the hand gesture detection and the hand gesture detection result can act as examples of the auxiliary information detection and the auxiliary information, respectively, but the present invention is not limited thereto.

According to some embodiments, the implementation of the auxiliary information detection circuit 215 can vary. For example, the auxiliary information detection circuit 215 can be implemented by a mouth shape detection circuit that is arranged to perform mouth shape detection upon mouth shape image data in the image data received from the image capturing device 202 to generate at least one mouth shape detection result as the auxiliary information. More particularly, performing the auxiliary information detection to generate the auxiliary formation can include:

performing the mouth shape detection upon the mouth shape image data in the image data to generate the mouth shape detection result as the auxiliary information;

wherein the mouth shape detection and the mouth shape detection result can act as examples of the auxiliary information detection and the auxiliary information, respectively, and the predetermined hand gesture can be replaced by a predetermined mouth shape.

Specifically, regarding operations of the above-mentioned first stage, the first sub-circuit in the auxiliary information detection circuit 215 can utilize the deep learning method or the neural network method to process at least one frame in the image data to perform human mouth recognition (e.g. utilize multiple different convolution kernels to perform multiple convolution operations upon the frame (e.g. the image frame), to recognize whether there is a human mouth in the frame). In response to a human mouth recognition result of the human mouth recognition (e.g. when the human mouth in the frame is recognized), the auxiliary information detection circuit 215 can obtain the mouth shape image data from the image data.

Regarding the operations of the above-mentioned second stage, the second sub-circuit in the auxiliary information detection circuit 215 can utilize the deep learning method or the neural network method to process the mouth shape image data (e.g. utilize multiple different convolution kernels to perform multiple convolution operations upon the mouth shape image data, to recognize whether the predetermined mouth shape is in the mouth shape image data). It should be noted that associated circuit designs regarding the human mouth recognition and the mouth shape recognition are similar to the circuit designs related to the person recognition, and therefore are well known to those with ordinary knowledge in the art.

In another example, the auxiliary information detection circuit 215 can be implemented by a voiceprint detection circuit that is coupled to the microphones 204_1-204_N and the processing circuit 240 (e.g. an input source of the auxiliary information detection circuit 215 can be modified from the image capturing device 202 to the microphones 204_1-204_N), and the voiceprint detection circuit is arranged to perform voiceprint detection upon voice data of the main sound to generate at least one voiceprint detection result as the auxiliary information. More particularly, performing the auxiliary information detection to generate the auxiliary information can include:

performing the voiceprint detection upon the voice data of the main sound to generate the voiceprint detection result as the auxiliary information;

wherein the voiceprint detection and the voiceprint detection result can act as examples of the auxiliary information detection and the auxiliary information, respectively, and the predetermined hand gesture can be replaced by a predetermined voiceprint.

Specifically, since each person's voice has unique characteristics, the auxiliary information detection circuit 215 can generate the voiceprint detection result as the auxiliary information by capturing one or more sound clips and performing voiceprint recognition upon the one or more sound clips, wherein the voiceprint detection result can indicate which voice characteristic values of the one or more sound clips belong to which person in the regions 410-450. For brevity, similar descriptions for these embodiments are not repeated in detail here.

Figure 8:
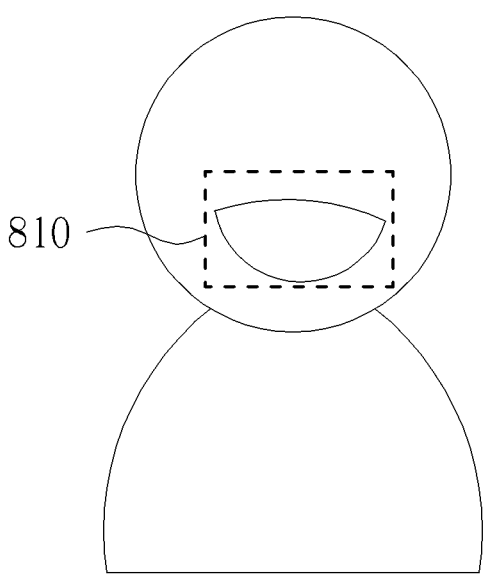
FIG. 8 is a diagram illustrating a predetermined mouth shape according to an embodiment of the present invention.

FIG. 8 is a diagram illustrating a predetermined mouth shape according to an embodiment of the present invention, wherein the predetermined mouth shape can be a mouth shape that is speaking, such as a predetermined mouth shape with a larger mouth opening. The auxiliary information detection circuit 215 can utilize the first sub-circuit therein to perform the human mouth recognition upon the image (e.g. the image frame, such as the image data) to generate the human mouth recognition result, and obtain a partial image 810 from the image according to the human mouth recognition result to act as a mouth shape image (e.g. the mouth shape image data). In addition, the auxiliary information detection circuit 215 can utilize the second sub-circuit therein to perform the mouth shape detection upon the mouth shape image (e.g. the mouth shape image data) to generate a corresponding mouth shape detection result. For brevity, similar descriptions for this embodiment are not repeated in detail here.

Figure 9:
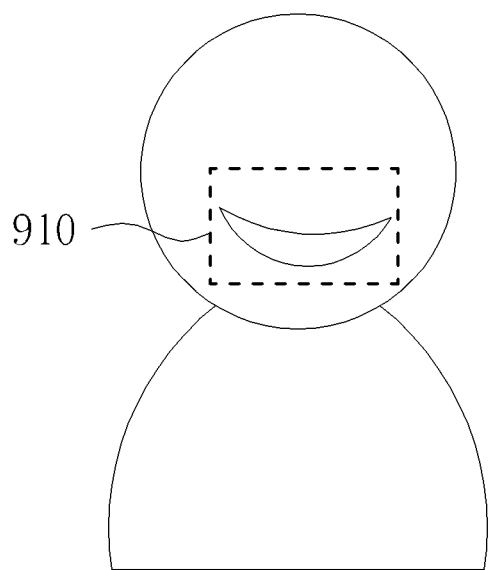
FIG. 9 is a diagram illustrating a predetermined mouth shape according to another embodiment of the present invention.

FIG. 9 is a diagram illustrating a predetermined mouth shape according to another embodiment of the present invention, wherein the predetermined mouth shape can be a mouth shape that is speaking, such as a predetermined mouth shape with a smaller mouth opening. The auxiliary information detection circuit 215 can utilize the first sub-circuit therein to perform the human mouth recognition upon the image (e.g. the image frame, such as the image data) to generate the human mouth recognition result, and obtain a partial image 910 from the image according to the human mouth recognition result, to act as a mouth shape image (e.g. the mouth shape image data). In addition, the auxiliary information detection circuit 215 can utilize the second sub-circuit therein to perform the mouth shape detection upon the mouth shape image (e.g. the mouth shape image data) to generate a corresponding mouth shape detection result. For brevity, similar descriptions for this embodiment are not repeated in detail here.

According to some embodiments, the auxiliary information detection circuit 215 is not limited to the mouth shape detection with a single predetermined mouth shape, and more particularly, the predetermined mouth shape can be replaced by a predetermined mouth shape set, wherein the predetermined mouth shape set can include multiple predetermined mouth shapes (e.g. the predetermined mouth shapes shown in FIG. 8 and FIG. 9). For example, any person in the regions 410-450 can be speaking such that his/her mouth will form any predetermined mouth shape in the predetermined mouth shape set, and the processing circuit 240 can determine that the speaker has been changed to the any person. For brevity, similar descriptions for these embodiments are not repeated in detail here.

According to some embodiments, shape, type, and/or direction of the multiple predetermined mouth shapes in the predetermined mouth shape set may vary.

Figure 10:
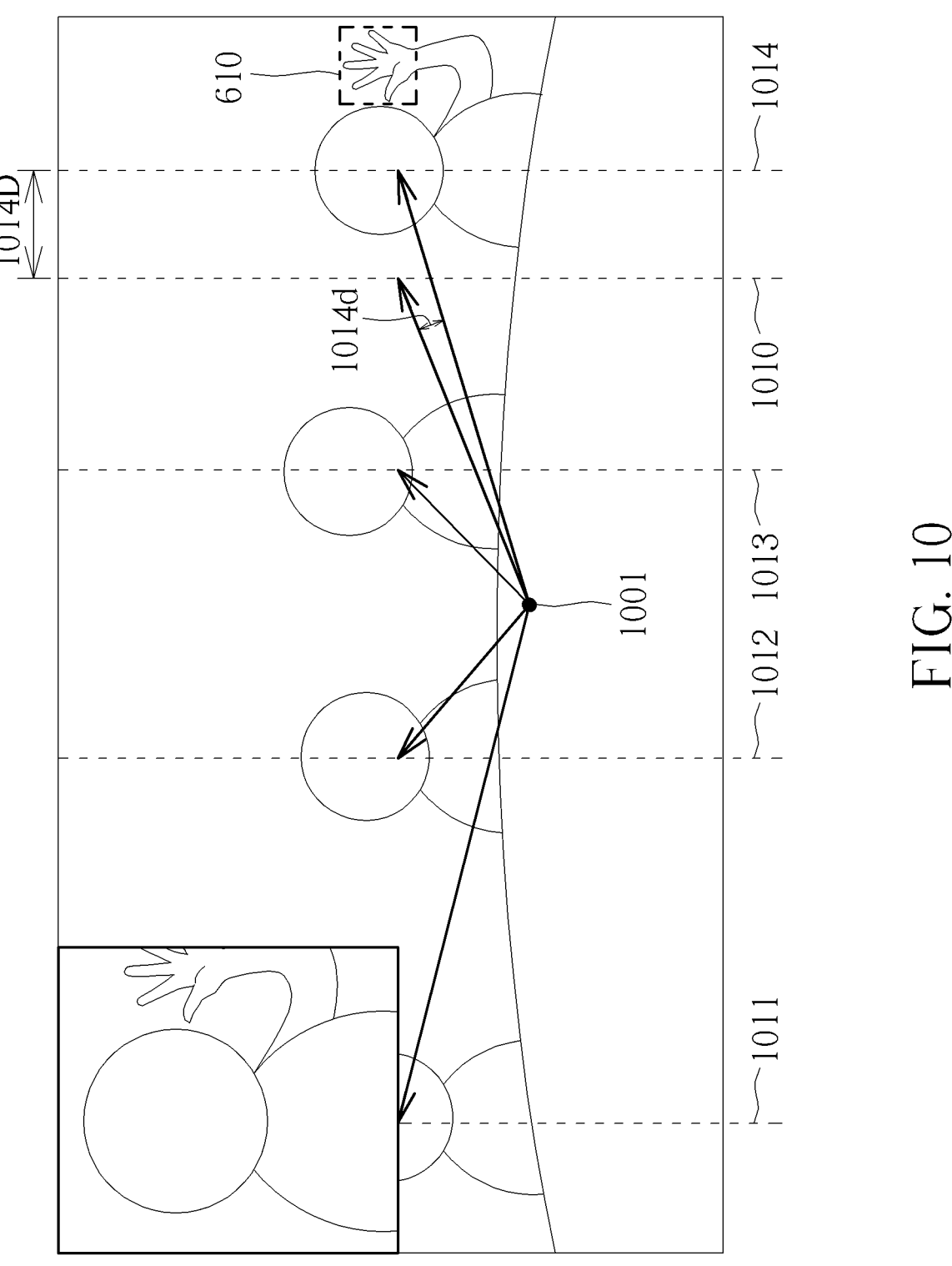
FIG. 10 is a diagram illustrating auxiliary information detection and associated calibration according to an embodiment of the present invention.

FIG. 10 is a diagram illustrating auxiliary information detection and associated calibration according to an embodiment of the present invention, wherein the specific region highlighting the speaker (e.g. the region 440) can be highlighted by picture-in-picture (PiP) as shown in the upper left corner of FIG. 10, but the present invention is not limited thereto. A reference point 1001 can represent the position of the electronic device 110 in the space (e.g. the space of the first conference room) indicated by the image (e.g. the image frame, such as the image data), and reference lines 1011, 1012, 1013, and 1014 can indicate azimuths of four people in the space relative to the electronic device 110 (e.g. the image capturing device 202), respectively, and more particularly, can represent horizontal coordinates corresponding to points of four vectors (e.g. four arrows starting from the reference point 1001) of the azimuths passing through the image (e.g. the image frame), respectively, such as horizontal coordinates of center points of regions where the four people are located (e.g. four regions in the regions 410-450).

In addition, a reference line 1010 can indicate the voice characteristic value of the main sound (e.g. the azimuth of the main sound), and more particularly, can represent a horizontal coordinate corresponding to a point of the vector of the azimuth (e.g. another arrow from the reference point 1001) passing through the image (e.g. the image frame), wherein an azimuth difference 1014d and a horizontal coordinate difference 1014D can act as examples of the azimuth difference and the horizontal coordinate difference, respectively. Although the reference line 1010 can be located between the reference lines 1013 and 1014 without being very close to the reference line 1014, the SoC 200 can still determine that the speaker is the rightmost person according to the partial image 610 (e.g. which acts as the hand gesture image/the hand gesture image data), to highlight the region corresponding to the reference line 1014 (as shown in the upper left corner of FIG. 10). For brevity, similar descriptions for this embodiment are not repeated in detail here.

In the above embodiments, the sound direction detection circuit 230 is regarded as the sound detection circuit, but the present invention is not limited thereto. In other embodiments, the sound detection circuit can be equipped with the voiceprint recognition mechanism (e.g. a voiceprint recognition sub-circuit), and more particularly, the sound detection circuit can include the sound direction detection circuit 230 and the voiceprint recognition sub-circuit, and utilize the sound direction detection circuit 230 with the aid of the voiceprint recognition mechanism (e.g. the voiceprint recognition sub-circuit) to determine the speaker and the highlighted person. For example, the sound detection circuit of the present invention can receive and obtain multiple sound signals from multiple microphones to determine a voice characteristic value of a main sound, and the voice characteristic value can be a voiceprint (e.g. the voiceprint of sound clips detected by the voiceprint recognition sub-circuit) or an azimuth of the main sound.

In summary, the video processing method of the present invention can effectively improve video conference efficiency by detecting a current speaker and highlighting the speaker in the image data, thereby enabling participants in a remote conference room to clearly identify the speaker. In addition, the video processing method and the SoC of the present invention can ensure correctness of related operations with the aid of auxiliary information, and more particularly, perform associated calibration according to the auxiliary information to keep maintaining usability of the voice characteristic value (e.g. the azimuth) of the main sound, thereby avoiding any false highlighted region switching.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

13

1. A system on chip (SoC), arranged to perform partial highlighting with the aid of auxiliary information detection, comprising:

a person recognition circuit, arranged to obtain an image data from an image capturing device, and perform person recognition on the image data to generate a recognition result;

a sound detection circuit, arranged to receive a plurality of sound signals from a plurality of microphones, and determine a voice characteristic value of a main sound;

an auxiliary information detection circuit, arranged to perform auxiliary information detection to generate auxiliary information of the image data; and a processing circuit, coupled to the person recognition circuit, the auxiliary information detection circuit, and the sound detection circuit, and arranged to determine a specific region in the image data according to the recognition result and the voice characteristic value of the main sound, and process the image data to highlight the specific region, wherein regarding determination of the specific region in the image data, the processing circuit compares a difference in the voice characteristic value of the main sound with a predetermined threshold, wherein when the difference in the voice characteristic value of the main sound is greater than the predetermined threshold, the processing circuit determines the specific region according to the recognition result, the voice characteristic value of the main sound and the auxiliary information without adjusting the voice characteristic value of the main sound;

wherein the predetermined threshold is a voice characteristic value difference.

2. The SoC of claim 1, further comprising:

a voice activity detection circuit, arranged to determine whether at least one part of the multiple sound signals comprises a voice component according to the multiple sound signals;

wherein according to whether the at least one part of the multiple sound signals comprises the voice component, the processing circuit determines whether to determine the specific region in the image data according to the recognition result, the auxiliary information, and the voice characteristic value of the main sound.

3. The SoC of claim 2, wherein when the voice activity detection circuit indicates that the at least one part of the multiple sound signals comprises the voice component, the processing circuit determines the specific region in the image data according to the recognition result, the auxiliary information, and the voice characteristic value of the main sound, and processes the image data to highlight the specific region.

4. The SoC of claim 1, wherein the recognition result comprises multiple regions, and each of the multiple regions comprises a person; and the processing circuit selects a region from the multiple regions as the specific region according to the voice characteristic value of the main sound and the auxiliary information.

5. The SoC of claim 4, wherein the recognition result further comprises multiple characteristic values corresponding to the multiple regions, respectively, and the processing circuit tracks a characteristic value of the specific region to determine a location of the specific region in a subsequent image data, and processes the subsequent image data to highlight the specific region in the subsequent image data.

6. The SoC of claim 5, further comprising:

a voice activity detection circuit, arranged to determine whether at least one part of the multiple sound signals comprises a voice component according to the multiple sound signals;

wherein according to the multiple characteristic values that correspond to the multiple regions, respectively, and are determined by the person recognition circuit, the auxiliary information, the voice characteristic value of the main sound determined by the sound detection circuit, and whether the at least one part of the multiple sound signals comprises the voice component determined by the voice activity detection circuit, the processing circuit determines whether a speaker changes for determining whether to select another region from the multiple regions as the specific region.

7. The SoC of claim 1, wherein the processing circuit processes the image data to magnify a person within the specific region.

8. The SoC of claim 1, wherein the voice characteristic value of the main sound is a voiceprint or an azimuth of the main sound.

9. The SoC of claim 1, wherein the auxiliary information detection circuit is arranged to:

perform hand gesture detection upon hand gesture image data in the image data to generate a hand gesture detection result as the auxiliary information; or perform mouth shape detection upon mouth shape image data in the image data to generate a mouth shape detection result as the auxiliary information.

10. A video processing method, arranged to perform partial highlighting with the aid of auxiliary information detection, comprising:

obtaining an image data from an image capturing device, and performing person recognition upon the image data to generate a recognition result;

receiving a plurality of sound signals from a plurality of microphones, and determining a voice characteristic value of a main sound;

performing auxiliary information detection to generate auxiliary information of the image data;

determining a specific region in the image data according to the recognition result and the voice characteristic value of the main sound, wherein regarding determination of the specific region in the image data, a difference in the voice characteristic value of the main sound is compared with a predetermined threshold, wherein when the difference in the voice characteristic value of the main sound is greater than the predetermined threshold, determining the specific region according to the recognition result, the voice characteristic value of the main sound and the auxiliary information without adjusting the voice characteristic value of the main sound; and processing the image data to highlight the specific region;

wherein the predetermined threshold is a voice characteristic value difference.

11. The video processing method of claim 10, wherein recognition result comprises multiple regions, and each of the multiple regions comprises a person; and the step of determining the specific region in the image data according to the recognition result, the auxiliary information, and the voice characteristic value of the main sound comprises:

selecting a region from the multiple regions as the specific region according to the voice characteristic value of the main sound and the auxiliary information.

12. The video processing method of claim 11, wherein the recognition result further comprises multiple characteristic values corresponding to the multiple regions, respectively, and the step of processing the image data to highlight the specific region comprises:

tracking a characteristic value of the specific region to determine a location of the specific region in a subsequent image data; and processing the subsequent image data to highlight the specific region in the subsequent image data.

13. The video processing method of claim 10, wherein the step of processing the image data to highlight the specific region comprises:

processing the image data to magnify a person within the specific region.

14. The video processing method of claim 10, wherein the voice characteristic value of the main sound is a voiceprint or an azimuth of the main sound.

15. The video processing method of claim 10, wherein the step of performing auxiliary information detection to generate auxiliary information for calibrating the voice characteristic value of the main sound comprises:

performing hand gesture detection upon hand gesture image data in the image data to generate a hand gesture detection result as the auxiliary information; or performing mouth shape detection upon mouth shape image data in the image data to generate a mouth shape detection result as the auxiliary information.

* * * * *